(12) United States Patent
Kim et al.

(10) Patent No.: US 8,310,974 B2
(45) Date of Patent: Nov. 13, 2012

(54) APPARATUS AND METHOD FOR SUPPORTING MULTICAST AND BROADCAST SERVICE IN A BROADBAND WIRELESS ACCESS (BWA) SYSTEM

(75) Inventors: Jun-Hyung Kim, Suwon-si (KR);
Nae-Hyun Lim, Seoul (KR); Sung-Oh Hwang, Yongin-si (KR); Bo-Sun Jung, Seongnam-si (KR); Kook-Heui Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1026 days.

(21) Appl. No.: 12/205,000

(22) Filed: Sep. 5, 2008

(65) Prior Publication Data
US 2009/0069003 A1    Mar. 12, 2009

(30) Foreign Application Priority Data

Sep. 6, 2007  (KR) .................. 10-2007-0090640
Feb. 18, 2008  (KR) .................. 10-2008-0014640

(51) Int. Cl.
*H04H 20/71* (2008.01)
*H04L 12/28* (2006.01)
(52) U.S. Cl. .................. 370/312; 370/390; 455/3.01
(58) Field of Classification Search .................. 370/312, 370/390; 455/3.01
See application file for complete search history.

(56) References Cited

U.S. PATENT DOCUMENTS

| | | | |
|---|---|---|---|
| 2003/0224794 A1* | 12/2003 | Kim et al. ...................... | 455/445 |
| 2006/0030312 A1* | 2/2006 | Han et al. .................... | 455/432.1 |
| 2007/0022451 A1 | 1/2007 | Lee et al. | |
| 2007/0093202 A1* | 4/2007 | Hwang et al. ................ | 455/3.06 |
| 2007/0110056 A1 | 5/2007 | Hwang et al. | |
| 2007/0127476 A1* | 6/2007 | Seppala ........................ | 370/390 |
| 2008/0051026 A1* | 2/2008 | Kim et al. .................... | 455/3.01 |
| 2008/0123645 A1* | 5/2008 | Pichna et al. ................. | 370/390 |
| 2008/0127290 A1* | 5/2008 | Delegue et al. .............. | 725/114 |
| 2008/0285497 A1* | 11/2008 | Pichna et al. ................. | 370/312 |
| 2009/0030931 A1* | 1/2009 | Khivesara et al. ............ | 707/102 |

FOREIGN PATENT DOCUMENTS

| | | |
|---|---|---|
| JP | 2006-279860 A | 10/2006 |
| KR | 10-2003-0089340 A | 11/2003 |
| KR | 10-2003-0097559 A | 12/2003 |
| KR | 10-2007-0080529 A | 8/2007 |

* cited by examiner

*Primary Examiner* — Ricky Ngo
*Assistant Examiner* — Paul H Masur
(74) *Attorney, Agent, or Firm* — Jefferson IP Law, LLP (57) ABSTRACT

An apparatus and a method for providing a MultiCast and BroadCast Service (MCBCS) in a Broadband Wireless Access (BWA) system are provided. The method includes receiving a message comprising information relating to a broadcast channel which carries a service guide, from a Base Station (BS), receiving service guides relating to one or more service providers over the broadcast channel using the information, when the received service guides are fragmented service guides having a certain size, generating a unified service guide by reassembling the fragmented service guides and when one service provider is selected, filtering only a service guide of the selected service provider in the unified service guide and displaying the filtered service guide in a display. Thus, the channel transition time can be reduced.

10 Claims, 11 Drawing Sheets

APPARATUS AND METHOD FOR SUPPORTING MULTICAST AND BROADCAST SERVICE IN A BROADBAND WIRELESS ACCESS (BWA) SYSTEM

PRIORITY

This application claims priority under 35 U.S.C. §119(a) to a Korean patent application filed in the Korean Intellectual Property Office on Sep. 6, 2007 and assigned Serial No. 2007-90640 and a Korean patent application filed in the Korean Intellectual Property Office on Feb. 18, 2008 and assigned Serial No. 2008-14640, the entire disclosures of both of which are hereby incorporated by reference.

BACKGROUND OF THE INVENTION

1. Field of the Invention

The present invention relates to a Broadband Wireless Access (BWA) system. More particularly, the present invention relates to an apparatus and a method for providing a MultiCast and BroadCast Service (MCBCS).

2. Description of the Related Art

In general, communication systems were developed based on providing a voice service. With advances in technology, communication systems now provide data services and various multimedia services as well as the voice service. However, the voice oriented communication systems are not able to satisfy users' service needs because of their relatively narrow transmission bandwidths and expensive fees. Additionally, advances of the communication industry and users' increasing demand for an Internet service raise the necessity for communication systems that efficiently provide an Internet service. To respond to this demand, a Broadband Wireless Access (BWA) system is presented with enough bandwidth to meet the users' increasing demand for an efficiently provided Internet service.

The BWA system integrally supports not only a voice service, but also multimedia application services such as various low- and high-speed data services and high-definition video. The BWA system is a radio communication system capable of accessing a Public Switched Telephone Network (PSTN), a Public Switched Data Network (PSDN), the Internet, an International Mobile Telecommunications (IMT)-2000 network, and an Asynchronous Transfer Mode (ATM) network in a mobile or stationary environment based on radio media using bandwidths of 2 GHz, 5 GHz, 26 GHz, and 60 GHz, and supporting a data transfer rate over 2 Megabits per second (Mbps). The BWA system can be classified as a broadband wireless subscriber network, a broadband mobile access network, and a high-speed wireless Local Area Network (LAN) based on the mobility of the terminal (stationary or mobile), the communication environment (indoor or outdoor), and the channel transfer rate.

As a representative example of the radio access scheme of the BWA system, the Institute of Electrical and Electronics Engineers (IEEE) 802.16e standard is standardized by the IEEE 802.16 Working Group, which is an international standardization organization.

Compared to a conventional radio technique for providing a voice service, the IEEE 802.16e standard can transfer a greater amount of data within a shorter time using the wide data bandwidth and allow more users to efficiently share and utilize the channel (or resource). Also, with Quality of Service (QoS) guaranteed, the users can enjoy services of different qualities according to the service characteristics.

Yet, a network access technique of the WiMAX Forum, adopting the IEEE 802.16e standard for the radio access network, defines only a one-to-one communication method for the multimedia service transmission. In terms of the amount of data provided by the multimedia service and a great number of users who request a specific multimedia service at the same time, the current one-to-one communication method of the WiMAX Forum inefficiently uses the limited radio resources available for the transmission of the multimedia service. This increases the burden to the user of the multimedia service and limits the number of users who may receive service at the same time.

According to a conventional MultiCast and BroadCast Service (MCBCS) method, to request to receive a specific channel, a terminal generates an MCBCS connection through a DSx procedure with a base station and receives a MAC parameter such as Multicast Connection IDentifier (MCID). Every time the user requests a channel change, the terminal which is receiving the specific channel needs to perform a Dynamic Service Deletion (DSD) of the existing channel and a Dynamic Service Add (DSA) of a new channel with the base station. This causes a channel transition time delay and the successive DSx procedure may waste radio resources.

As discussed above, to address the shortcomings of the conventional MCBCS method and to provide more efficient service in view of the user and a service provider, a new definition of functions of network entities and an information delivery method between the entities are needed.

SUMMARY OF THE INVENTION

An aspect of the present invention is to address at least the above mentioned problems and/or disadvantages and to provide at least the advantages described below. Accordingly, an aspect of the present invention is to provide an apparatus and a method for providing a MultiCast and BroadCast Service (MCBCS) in a Broadband Wireless Access (BWA) system.

Another aspect of the present invention is to provide a network structure for efficiently providing an MCBCS in a BWA system, an apparatus and a method for entities of the network structure to support various business models and techniques.

Yet another aspect of the present invention is to provide an apparatus and a method for providing an MCBCS to a plurality of terminals in a BWA system.

Still another aspect of the present invention is to provide an apparatus and a method for shortening a channel transition delay time according to a user's channel change in a BWA system.

According to an aspect of the present invention, a method of a Mobile Station (MS) for receiving a service guide in a BWA system is provided. The method includes receiving a message comprising information relating to a broadcast channel which carries a service guide, from a Base Station (BS), receiving service guides relating to one or more service providers over the broadcast channel using the information, when the received service guides are fragmented service guides having a certain size, generating a unified service guide by reassembling the fragmented service guides and when one service provider is selected, filtering only a service guide of the selected service provider in the unified service guide and displaying the filtered service guide in a display.

According to another aspect of the present invention, a method of an MCBCS network layer server for providing a service guide in a BWA system is provided. The method includes receiving service guides from one or more service providers, aggregating the received service guides based on an MCBCS transmission zone in each service area and transmitting the aggregated service guides to an MCBCS controller of a corresponding service area.

According to still another aspect of the present invention, an apparatus for providing a service guide in a BWA system is provided. The apparatus includes a BS for transmitting a message comprising information relating to a broadcast channel which caries the service guide and for broadcasting service guides of one or more service providers over the broadcast channel and an MS for receiving the message, for receiving the service guides using the information relating to the broadcast channel of the message, for generating a unified service guide by reassembling fragmented service guides when the received service guides are fragmented service guides in a certain size, for filtering only a service guide of a selected service provider in the unified service guide and for displaying the filtered service guide in a display when one service provider is selected.

According to yet another aspect of the present invention, a method of an MCBCS controller for providing an MCBCS in a BWA system is provided. The method includes receiving a service initialization request message for a channel list selected by a service requesting user, from an MCBCS server, allocating MAC layer information for channels of the channel list and transmitting a service initialization response message comprising the allocated MAC layer information to the MCBCS server.

According to still another aspect of the present invention, a method of an MCBCS server for providing an MCBCS in a BWA system is provided. The method includes, when receiving a service guide request message from an MS, transmitting a service guide response message comprising information relating to channels to the MS and, when receiving from the MS a service request message comprising information relating to a channel list selected by a user, transmitting a service initialization request message to the MCBCS controller to instruct the MCBCS controller to allocate MAC layer information for the selected channel list.

According to further aspect of the present invention, an apparatus for providing an MCBCS in a BWA system is provided. The apparatus includes an MS for transmitting a service guide request message to an MCBCS server, for receiving a service guide response message comprising information relating to channels from the MCBCS server, and for transmitting a service request message comprising information relating to a selected channel list to the MCBCS server when a user selects a channel list to service from among the channels and the MCBCS server for transmitting a service guide response message comprising information relating to channels to the MS when receiving a service guide request message from the MS, and for transmitting a service initialization request message to the MCBCS controller to instruct the MCBCS controller to allocate MAC layer information for the selected channel list when receiving from the MS a service request message comprising information relating to a channel list selected by a user.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments the present invention will become more apparent from the following detailed description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide an apparatus and a method for providing a MultiCast and BroadCast Service (MCBCS) in a Broadband Wireless Access (BWA) system. Note that the MCBCS is a term according to the WiMAX Forum and that the MCBCS can be referred to as a Multicast and Broadcast Service (MBS) depending on an intention of a standard group or a provider.

While the WiMAX NWG technology standardized by the WiMAX Forum is herein illustrated, the present invention is applicable to any other wireless communication networks of similar function. While the present invention is applicable to most services provided by IEEE 802.16 systems and WiMAX systems, the MCBCS is described by way of example.

Entities relating to the MCBCS are now described.

The entities related to the MCBCS are as follows. Typically, the entities related to the MCBCS include a Content Provider (CP), a Service Provider (SP), an Access Provider (AP), and a user.

The CP produces and provides MCBCS contents. The SP receives the contents from the CP and provides the contents to a user. The SP may provide the contents to the user for free or after receiving a fee from the user. The AP transmits the service of the SP to the user. While the CP, the SP, and the AP can be provided independently, a single unit may act as all three providers or as two or more providers. An example of the single unit is a terrestrial broadcasting provider in South Korea.

Certain of the main functions in the MCBCS are described below.

Service provisioning or subscription management: to process a subscription request and/or manage the subscriptions of users who use the MCBCS.

Data transmission function: to provide a multimedia service in various transmission forms. Typically, to transmit the multimedia service in real time or after reception.

Service protection from unauthorized use: to allow only an authorized user to use the MCBCS.

Multimedia content protection: To prevent unauthorized users from sharing higher value-added contents.

User terminal provisioning: to manage hardware, firmware, and software of various user terminals.

Service guide provision: to provide information needed by the user of the MCBCS and information required by the user terminal.

Aperiodic notification of information important to user or user terminal: to aperiodically provide information required by the user or the user terminal as requested by the CP, SP, and AP.

Core network and access network resource optimization: to efficiently utilize resources of a core network and an access network in the MCBCS transmission.

Radio resource optimization: to transmit the MCBCS to the user terminal by efficiently using the limited radio resource.

Generally, a home television creates a broadcasting schedule table according to a schedule and broadcasts the broadcasting schedule information at a specific time or at the bottom of the screen so that a user can watch a desired program at an appropriate time. The broadcast time of not only the general TV programming but also of most of the additional broadcast services is determined in advance. Accordingly, the broadcasting schedule table is generated in advance so that the user can use it to determine what programs are available. The MCBCS provided by the WiMAX system also needs to provide a broadcasting schedule table to the user. In an exemplary embodiment of the present invention, a set of the broadcasting schedule table and the broadcasting information is referred to as a service guide. For example, the service guide can include content information, schedule information (start time/end time), and charge information.

Hereafter, a Base Station (BS) may be called a Radio Access Station (RAS), and an Access Service Network-Gate-Way (ASN-GW) may be called an Access Control Router (ACR).

Figure 1:
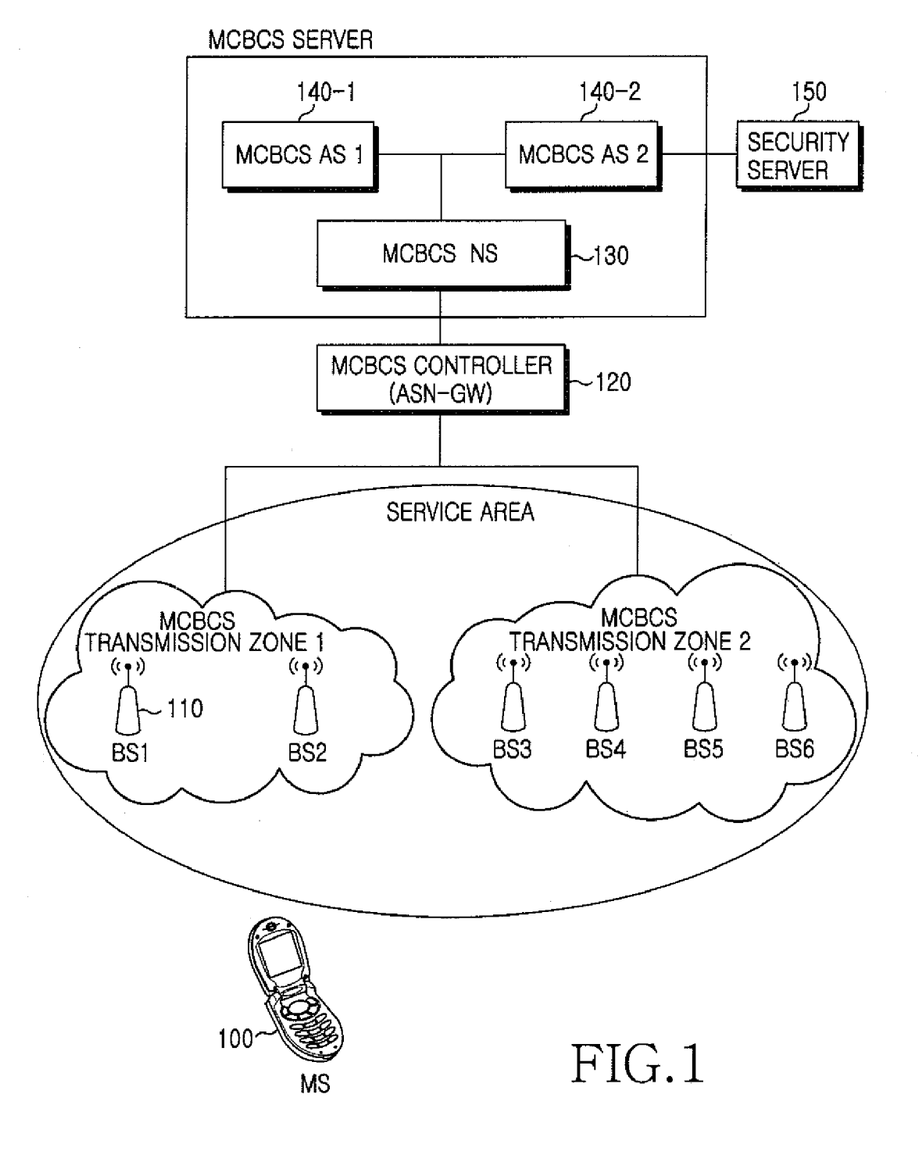
FIG. 1 illustrates a network for providing a multimedia service to a plurality of Mobile Stations (MSs) in a Broadband Wireless Access (BWA) system according to an exemplary embodiment of the present invention.

FIG. 1 illustrates a network for providing a multimedia service to a plurality of MSs in a BWA system according to an exemplary embodiment of the present invention.

The network of FIG. 1 includes a security server 150, MCBCS Application Servers (ASs) 140-1 and 140-2, an MCBCS Network layer Server (NS) 130, an MCBCS controller 120, a BS 110, and a Mobile Station (MS) 100. Herein, the MCBCS controller 120 may be an independent device positioned together with an ASN-GW, or the ASN-GW may function as the MCBCS controller 120. The MCBCS ASs 140-1 and 140-2 and the MCBCS NS 130, which are entities logically separated from each other, can be constituted as a single network entity. That is, the MCBCS ASs 140-1 and 140-2 and the MCBCS NS 130 can be constituted as an MCBCS server.

The security server 150 authenticates and authorizes a user who wants to subscribe for the MCBCS.

The MCBCS ASs 140-1 and 140-2 belong to a coverage area of the SP. To ensure the functions of the SP, the MCBCS ASs 140-1 and 140-2 are in charge of a subscription processing/managing function for the user who subscribed to the SP, a function for sending MCBCS contents to the AP, a user authentication function to control access of an unauthorized user, a function for protecting contents provided from the CP, a function for managing terminals of users, and a function for providing information necessary for the MCBCS. Herein, as aforementioned, the MCBCS ASs 140-1 and 140-2 may be positioned in the coverage area of the SP or in the coverage area of the AP together with the MCBCS NS 130 depending on the intention of the provider. Considering that the MCBCS is a broadcast service, the MCBCS ASs 140-1 and 140-2 can be positioned in the coverage area of the SP as described above. Considering that the MCBCS is a service subordinate to the WiMAX network, the MCBCS ASs 140-1 and 140-2 can be positioned in the AP coverage area together with the MCBCS NS 130. In an exemplary embodiment as illustrated in FIG. 1, a difference between the first MCBCS AS 140-1 and the second MCBCS AS 140-2 lies in that the first MCBCS AS 140-1 is for the SP which provides free service or does not provide an unauthorized user control function and does not provide a content protection function, and that the second MCBCS AS 140-2 is for the SP which provides the pay service, the unauthorized user control function, and the content protection function. The functions of the MCBCS ASs 140-1 and 140-2 are described in further detail below:

generate MCBCS information, e.g., a service guide: comply with a data model agreed among the MCBCS ASs when generating the service guide.

perform a subscription procedure for the user's MCBCS reception.

authenticate and authorize the user, and process the charging in association with the security server 150.

manage user groups based on MCBCS channels or MCBCS contents.

manage and distribute authentication keys based on the groups.

unauthorized user access control/multimedia content protection: manage and distribute content encryption and decryption keys.

stream transmission/file transmission: define a transmission protocol, manage a reception report for confirming whether the user normally receives the MCBCS contents, and manage a file metadata for file transmission.

user interaction: provide an interaction service for users.

notification/alert: when a broadcast schedule is changed or an emergency broadcasting is required, provide a service for informing the MCBCS subscribed user of such an event.

The MCBCS NS 130 is an important entity in the AP. The MCBCS NS 130 aggregates and transmits the MCBCS information (e.g., service guide) from the multiple SPs, manages the network resources for efficient utilization, and supports error-free data reception at the user terminal, which are described in further detail.

manage MCBCS transmission zone: manage a BS in a zone to be serviced based on the SPs.

process the service guide: aggregate service guides received from the MCBCS ASs, fragment the service guides if necessary, compress the service guides to lower consumption of network resources, and maintain and manage the service guides.

distribute the service guides: unicast or multicast.

stream transmission/file transmission: determine whether the user normally receives the MCBCS contents (in some cases, perform the same function as the MCBCS AS).

manage a multicast group by locating the users.

process the reception report: when the user reports the network condition using the reception report, process or otherwise reflect the reception report.

The MCBCS controller 120 is positioned in the AP. The MCBCS controller 120 supports a function for efficiently forwarding the MCBCS received through a central network over a radio network by interconnecting the central network and the access network. The MCBCS controller 120 also supports a function for informing the user terminal of the MCBCS start. These functions are described in further detail.

synchronize data/time to provide a macro diversity gain: reserve and allocate bursts, and process packets.

allocate and manage MBS zones.

allocate and manage MCID.

forward group paging information for notification.

The BS 110 wirelessly transmits the MCBCS. In an exemplary implementation, the MCBCS is received by cable. The BS 110 is managed by the AP.

The MS 100, which is a user terminal, provides the user with the MCBCS received through the network entities.

In FIG. 1, the service area indicates a coverage area where the SP provides the service. The MCBCS transmission zone, which is a transmission management region defined by the AP for efficient MCBCS transmission, indicates a coverage area where the same contents are broadcast. By contrast, the MBS zone indicates a coverage area where the MCBCS flow is effective through different Connection IDentifiers (IDs) or different Security Associations (SAs).

To actually provide the service using the network configuration of FIG. 1, a method for providing the MCBCS information and a method of a user terminal to receive the MCBCS information are now explained by referring to FIGS. 2 through 9B.

To provide the MCBCS, the network should support many functions. Basically, the network should be able to forward the user's intended MCBCS information. That is, the network should be able to forward the service guide.

The service guide can be forwarded through the unicast or the broadcast in consideration of the number and the distribution of terminals to receive the broadcasting. When a plurality of users want to view the contents, the unicast is inappropriate because network resources are inefficiently utilized. Conversely, when a small number of users want to view different contents respectively, the unicast is more efficient than the broadcast. The service guide forwarded as above should have a data model of a specific structure so that the AP can manage and distribute multiple service guides. To interpret the service guide, the user needs to know the structure of the preset data model.

The MCBCS can provide various charging methods for the user's intended contents, such as time charging, volume charging, token based charging, and flat charging. For charging, the user needs to subscribe to the SP. Such a subscription may include an online subscription and an offline subscription. According to the offline subscription, the user inputs charging information in advance, for example by executing a contract with the SP through a web based interface, a phone call, or a visit in person, without using the network of the AP. Conversely, according to the online subscription, the user provides subscription information and charging information over the network provided from the AP to receive the service. In doing so, a user authentication is performed and an ID for the corresponding service group is allocated. In this exemplary embodiment, only the online subscription is discussed here, leaving out the offline subscription.

Through the subscription, the user joins a group for a specific service reception. The SP provides the function for managing such groups. To use the actual MCBCS after the subscription, the user needs to pass through the authentication and authorization using the ID allocated in the subscription. The SP manages decryption keys for decrypting the encrypted contents being broadcast. When the user's authentication succeeds, the SP needs to provide the decryption key to the user.

Based on the service type or the network operation manner, the MCBCS can be classified into a broadcast service allowing every user to receive the contents, a static multicast service allowing only users who receive contents and pass through the authentication using a decryption key to decrypt and view specific contents, and a dynamic multicast service for selectively broadcasting contents only to a BS including a specific terminal subscribed to the service. The group management method and the decryption key transfer method differ depending on those service methods.

The MCBCS can provide the service protection function which allows only an authorized user through the user authentication, the authorization, and the decryption key management and distribution to receive particular contents, and the multimedia content protection function for allowing only the permitted user to reproduce the particular contents and restricting the content transfer to other devices.

The broadcast content transfer method includes a stream transmission and a file transmission based on the service type. The stream transmission is used to deliver real-time contents such as video and music, and the file transmission is used to deliver retransmittable contents having a weak real-time property. The stream transmission protocol adopts Realtime Transport Protocol (RTP) and may modify the RTP according to the employed codec. Typically, while the real-time traffic does not need the reception report, the reception report may be used to acquire statistical information of the network condition. The file transmission protocol can use a User Datagram Protocol (UDP), a File Delivery over Unidirectional Transport (FLUTE), and so forth. Depending on the protocol, file metadata is differently defined and used. The file transmission requires the reception report, which can be used to request the retransmission of a corrupted part of the contents, as well as to acquire the statistical information of the network condition.

When the broadcasting schedule is changed or an emergency broadcast is required, the notification method or the alert method is used to inform the user subscribed to the MCBCS. The SP, the AP, and the CP can transmit the notification or alert information to the user.

The MCBCS network can provide an interactive service to a user using the WiMAX system which provides a broadband uplink channel. For example, the MCBCS network may provide a vote service using user feedback and a download service for value-added contents such as products and music shown in the broadcast contents received. In addition, the MCBCS network can provide a function for indicating a user's broadcast use pattern.

Figure 2:
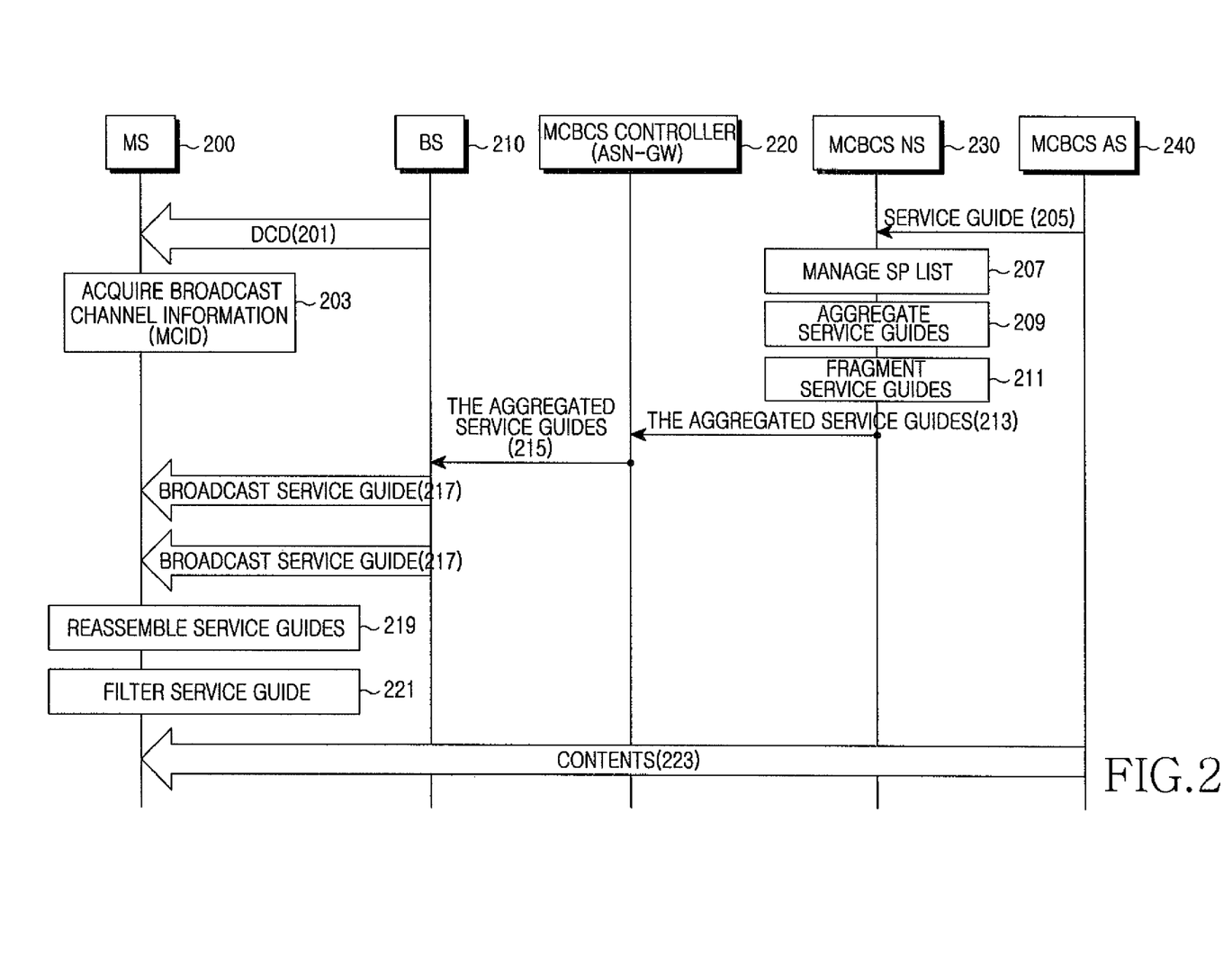
FIG. 2 illustrates signal flows for broadcasting MCBCS information in a BWA system according to an exemplary embodiment of the present invention.

FIG. 2 illustrates signal flows for broadcasting MCBCS information in a BWA system according to an exemplary embodiment of the present invention.

In step 201, the BS 210 allocates a broadcast channel to send the service guide in advance, and periodically broadcasts a DCD message to inform the MS 200 of information regarding the allocated broadcast channel. Herein, the DCD message includes an MCID for decoding the broadcast channel. In step 203, the MS 200 can obtain the broadcast channel information from the DCD message broadcast by the BS 210.

One or more MCBCS ASs 240 generates the service guides. In step 205, the one or more MCBCS ASs 240 provides the generated service guides to the MCBCS NS 230. The MCBCS NS 230 manages a list of MCBCS ASs and a list of BSs providing the services of the corresponding SPs to the MS in step 207. The MCBCS NS 230 aggregates the service guides received from one or more MCBCS ASs 240 per MCBCS transmission zone to send them as one flow per MCBCS transmission zone in each service area in step 209, and fragments the aggregated service guides into a certain size if necessary in step 211. In step 213, the MCBCS NS 230 transmits one or more aggregated and fragmented service guides per service area to the MCBCS controller 220 of the corresponding service area.

In step 215, the MCBCS controller 220 relays the service guides per MCBCS transmission zone received from the MCBCS NS 230 to the corresponding BS 210 so as to transmit the same service guide to BSs in the same MCBCS transmission zone.

In step 217, the BS 210 periodically broadcasts the aggregated and fragmented service guides over the broadcast channel using the MCID. Herein, the service guide is transmitted from the BS 210 to the MS 200 through the application layer.

In step 219, the MS 200 generates one unified service guide by reassembling the aggregated and fragmented service guides. Next, when the user selects one service provider (MCBCS AS) through a key manipulation for example, the MS 200 filters only the service guide of the corresponding service provider (MCBCS AS) from among the received service guides and displays the filtered service guide in a display in step 221. When the user selects contents of the corresponding MCBCS AS 240, for example through a key manipulation, the MS receives contents broadcast by the corresponding MCBCS AS 240 and displays the received contents in the display in step 223.

Figure 3:
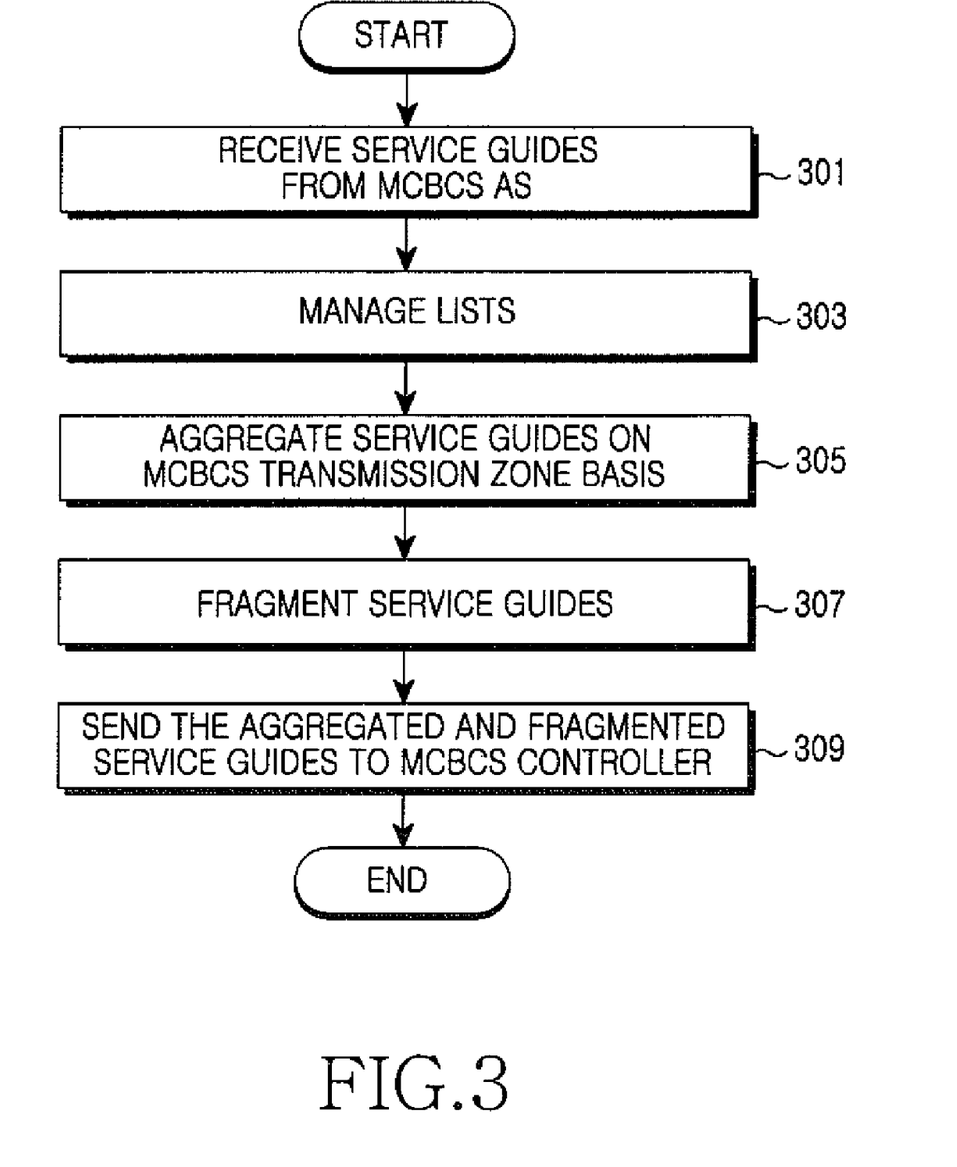
FIG. 3 illustrates a method of an MCBCS NS for broadcasting MCBCS information in a BWA system according to an exemplary embodiment of the present invention.

FIG. 3 illustrates a method of an MCBCS NS for broadcasting MCBCS information in a BWA system according to an exemplary embodiment of the present invention.

The MCBCS NS receives the service guides from one or more MCBCS ASs in step 301. In step 303, the MCBCS NS manages the list of the service providers (MCBCS ASs) and the list of BSs providing the service of the corresponding SP.

In step 305, the MCBCS NS aggregates the service guides received from one or more MCBCS ASs per MCBCS transmission zone to transmit them as one flow per MCBCS transmission zone in each service area. If necessary, the MCBCS NS fragments the aggregated service guides into a certain size in step 307.

In step 309, the MCBCS NS transmits the aggregated and fragmented service guides per service area to the MCBCS controller of the corresponding service area.

Next, the MCBCS NS finishes this process.

Figure 4:
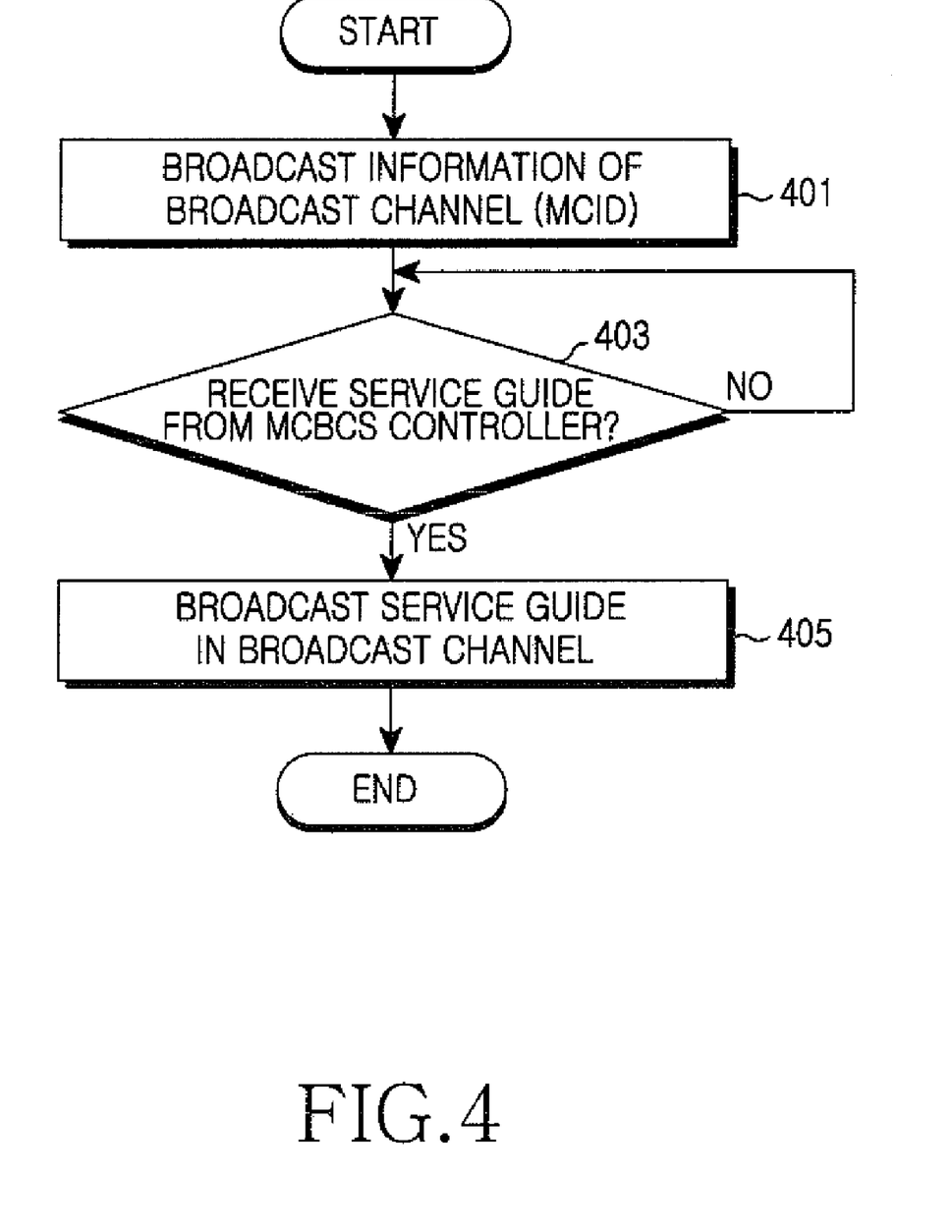
FIG. 4 illustrates a method of a base station for broadcasting MCBCS information in a BWA system according to an exemplary embodiment of the present invention.

FIG. 4 illustrates a method of a BS for broadcasting MCBCS information in a BWA system according to an exemplary embodiment of the present invention.

In step 401, the BS periodically broadcasts a DCD message to inform an MS of information about an allocated broadcast channel. Herein, the DCD message includes an MCID for decoding the broadcast channel. The broadcast channel for carrying the service guide may be allocated in advance.

In step 403, the BS determines whether a service guide is received from the MCBCS controller. When receiving the service guide, the BS periodically broadcasts the service guide over the broadcast channel using the MCID in step 405. Herein, the service guide is transmitted from the BS to the MS through the application layer.

Next, the BS finishes this process.

Figure 5:
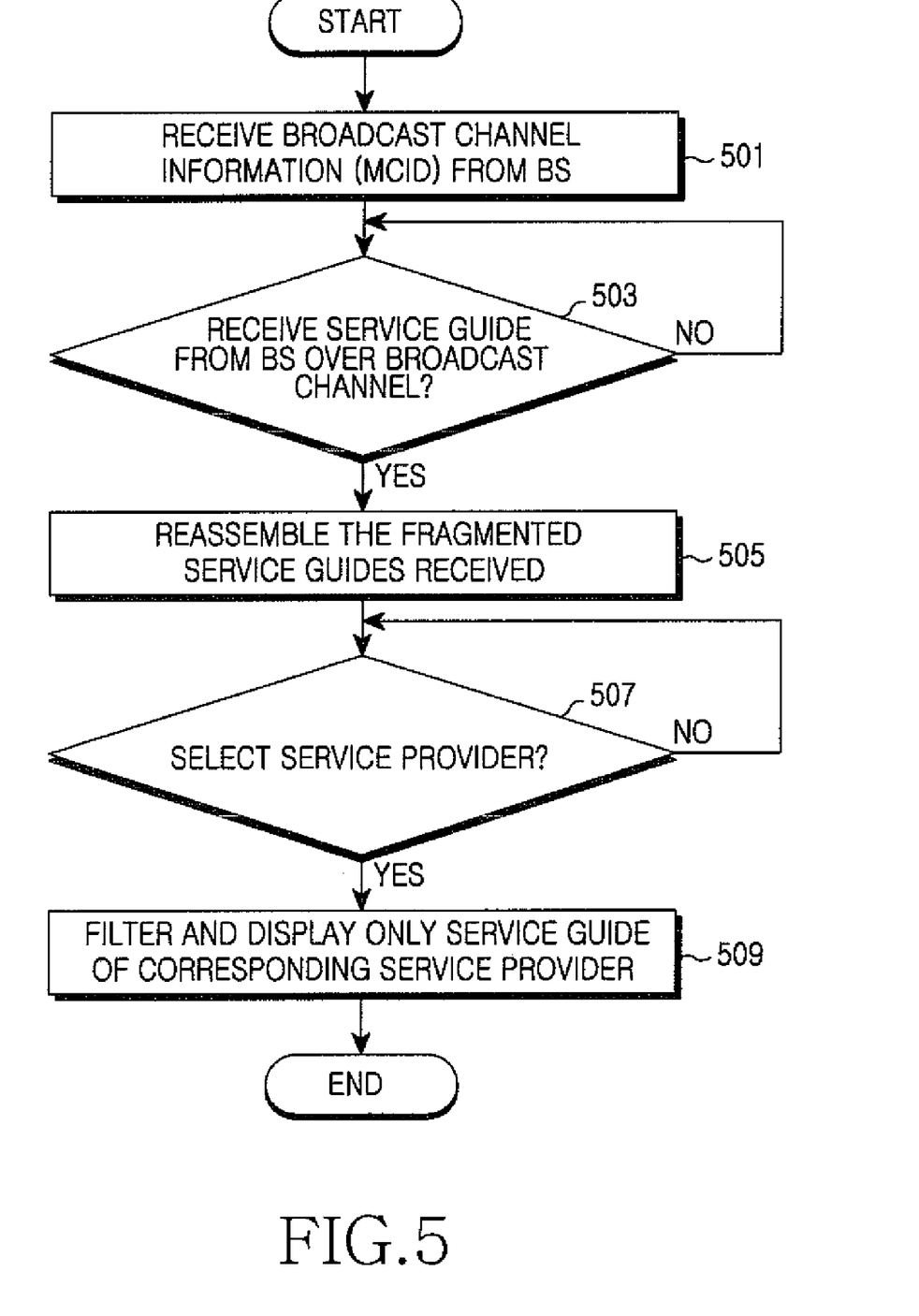
FIG. 5 illustrates a method of an MS for receiving the MCBCS information broadcast from the base station in a BWA system according to an exemplary embodiment of the present invention.

FIG. 5 illustrates a method of an MS for receiving the MCBCS information broadcast from the BS in a BWA system according to an exemplary embodiment of the present invention.

In step 501, the MS acquires information relating to the service guide broadcast channel by receiving the DCD message periodically broadcast by the BS. Herein, the DCD message includes the MCID for decoding the broadcast channel.

In step 503, the MS determines whether the aggregated and fragmented service guides are periodically received from the BS over the broadcast channel. Herein, the service guide is received through the application layer. When receiving the aggregated and fragmented service guides, the MS unifies the service guides by reassembling the received service guides in step 505.

In step 507, the MS determines whether the user selects one service provider (MCBCS AS), for example through key manipulation. When one service provider is selected, the MS filters only the service guide of the corresponding service provider (MCBCS AS) among the unified service guides and displays the filtered service guide in the display in step 509.

Next, the MS finishes this process.

Figure 6:
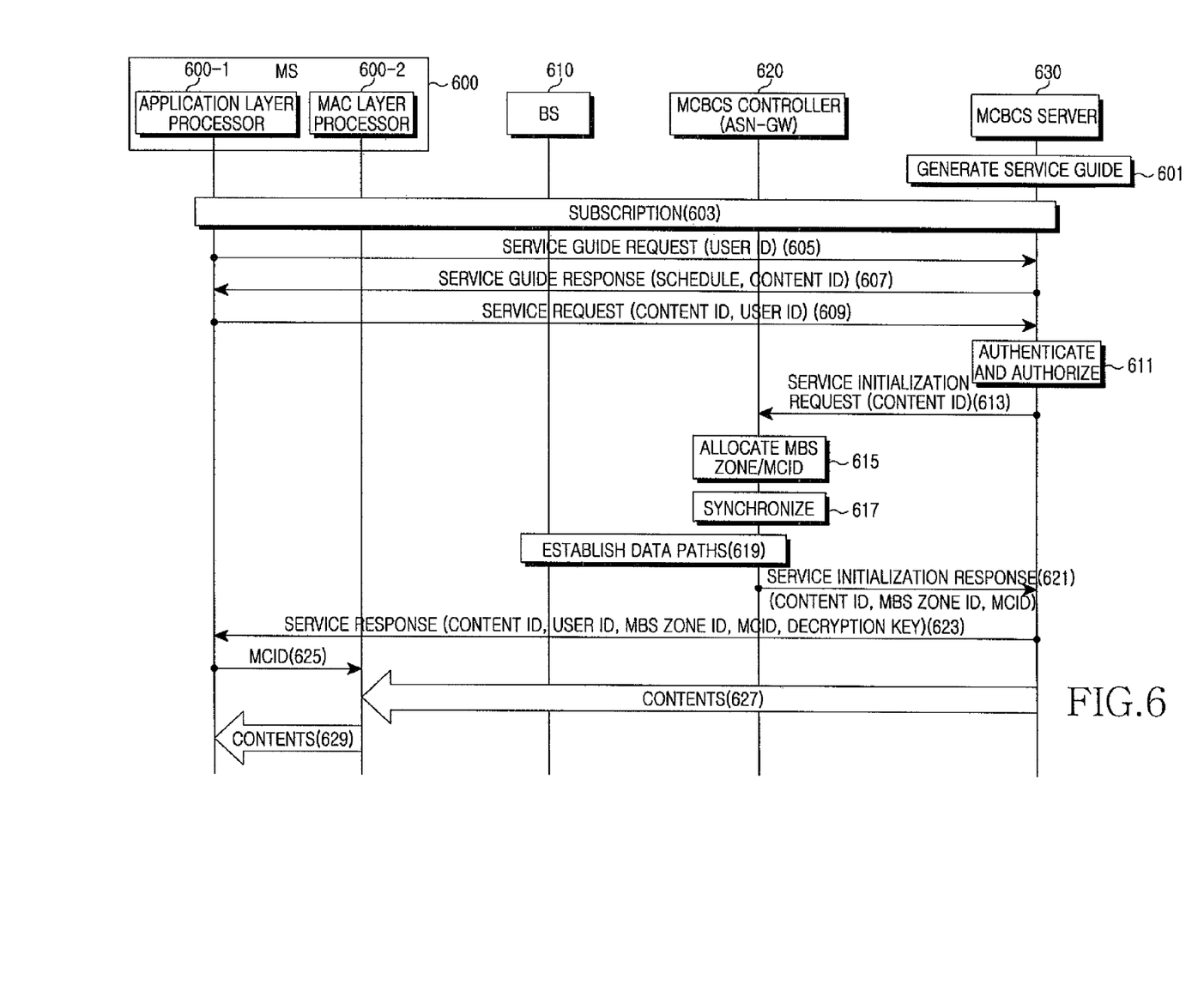
FIG. 6 illustrates signal flows of a method for unicasting MCBCS information in a BWA system according to an exemplary embodiment of the present invention.

FIG. 6 illustrates signal flows of a method for unicasting MCBCS information in a BWA system according to an exemplary embodiment of the present invention.

The MCBCS server 630 generates a service guide which describes information of its available contents in step 601. The service guide may include the information of contents readable by the user (i.e., content ID) and the broadcasting schedule.

To receive the MCBCS according to the user's request, the MS 600 performs the MCBCS subscription procedure with the MCBCS server 630 which provides the MCBCS in step 603. Herein, the subscription is carried out through the signaling in the WiMAX network, over the web, or offline. By dividing the processing function per layer, the MS 600 can include an application layer processor 600-1 for processing packets in the application layer and a MAC layer processor 600-2 for processing packets in the MAC layer. The subscription is processed by the application layer processor 600-2. Through the subscription, the MS 600 can obtain a user ID.

In step 605, the MS 600 sends a service guide request message to the MCBCS server 630 to acquire the MCBCS information. Herein, the service guide request message includes the user ID obtained in the subscription. Since the MS 600 knows an identification of the MCBCS server 630, for example a Uniform Resource Locator (URL) or an Internet Protocol (IP) address, the MS 600 can send the same message to the MCBCS server 630 according to a HyperText Transfer Protocol (HTTP) and the application layer protocol.

Upon receiving the service guide request message, the MCBCS server 630 determines whether the corresponding user is subscribed to the MCBCS using the user ID, and sends a service guide response message including the generated service guide to the MS 600 in step 607. That is, the service guide response message includes content IDs of the entire channel and the broadcasting schedule. Receiving the service guide response message, the application layer processor 600-1 of the MS 600 displays the service guide in the display. Upon confirming the service guide, the user can select a desired channel list (or content list) for service.

In step 609, the MS 600 sends a service request message to the MCBCS server 630 to request the service for the channel list selected by the user, for example by a key manipulation. Herein, the service request message includes the content IDs of the selected channel list and the user ID.

The MCBCS server 630 authenticates and authorizes the corresponding user using the user ID in step 611, and sends a service initialization request message for the selected channel list to the MCBCS controller 620 in step 613. Herein, the service initialization request message includes the content IDs of the selected channel list, and is carried together with content information such as broadcasting schedule, packet size, data rate of the selected channel (or content) list and the like.

When receiving the service initialization request message, the MCBCS controller 620 allocates MCIDs for the channels of the channel list of the requested service initialization using the content information in step 615. When it is necessary to allocate a new MBS zone in the region of the corresponding user, the MCBCS controller 620 also allocates an MBS zone ID to the corresponding user.

Next, the MCBCS controller 620 generates BS resource allocation and packetization information for the synchronization based on the content information received from the MCBCS server 630 in step 617, and establishes data paths for the content transmission to the BSs 610 in the corresponding MBS zone in step 619. Next, the MCBCS controller 620 sends a service initialization response message to the MCBCS server 630 in step 621. Herein, the service initialization response message includes MBS zone IDs and MCIDs per channel (or per content).

In step 623, the MCBCS server 630 sends a service response message for the selected channel list to the application layer processor 600-1 of the MS 600. Herein, the service response message includes the user ID, the MBS zone ID, the MCIDs per channel (or per content), and the content decryption key, so that the user terminal can decode the broadcast contents.

The user can select one channel to watch from the multiple channels requested for service. In this case, the application layer processor 600-1 of the MS 600 sends the MCID of the selected channel to the MAC layer processor 600-2 in step 625. The MAC layer processor 600-2 of the MS 600 decodes only contents corresponding to the MCID fed from the application layer processor 600-1 among the contents received from the MCBCS server 630 according to the service request in step 627, and provides the decoded contents to the application layer processor 600-1 in step 629. Hence, the user can receive only the selected contents among the plurality of the contents.

For instance, given 100 channels for the MCBCS in total, the service guide response message includes content IDs of 100 channels. The user can request the service of 20 channels. According to the service request, the MCBCS server 630 triggers the MCBCS controller 620 to allocate an MBS zone ID to the corresponding user and MCIDs for the 20 channels, and sends a service response message including the allocation information to the MS. Thus, the MS can get the MCBCS of the selected 20 channels. In more detail, the MCBCS server 630 provides contents of the selected 20 channels and the MS 600 can decode the corresponding contents using the MCID of one channel selected by the user among the 20 channels.

Figure 7A:
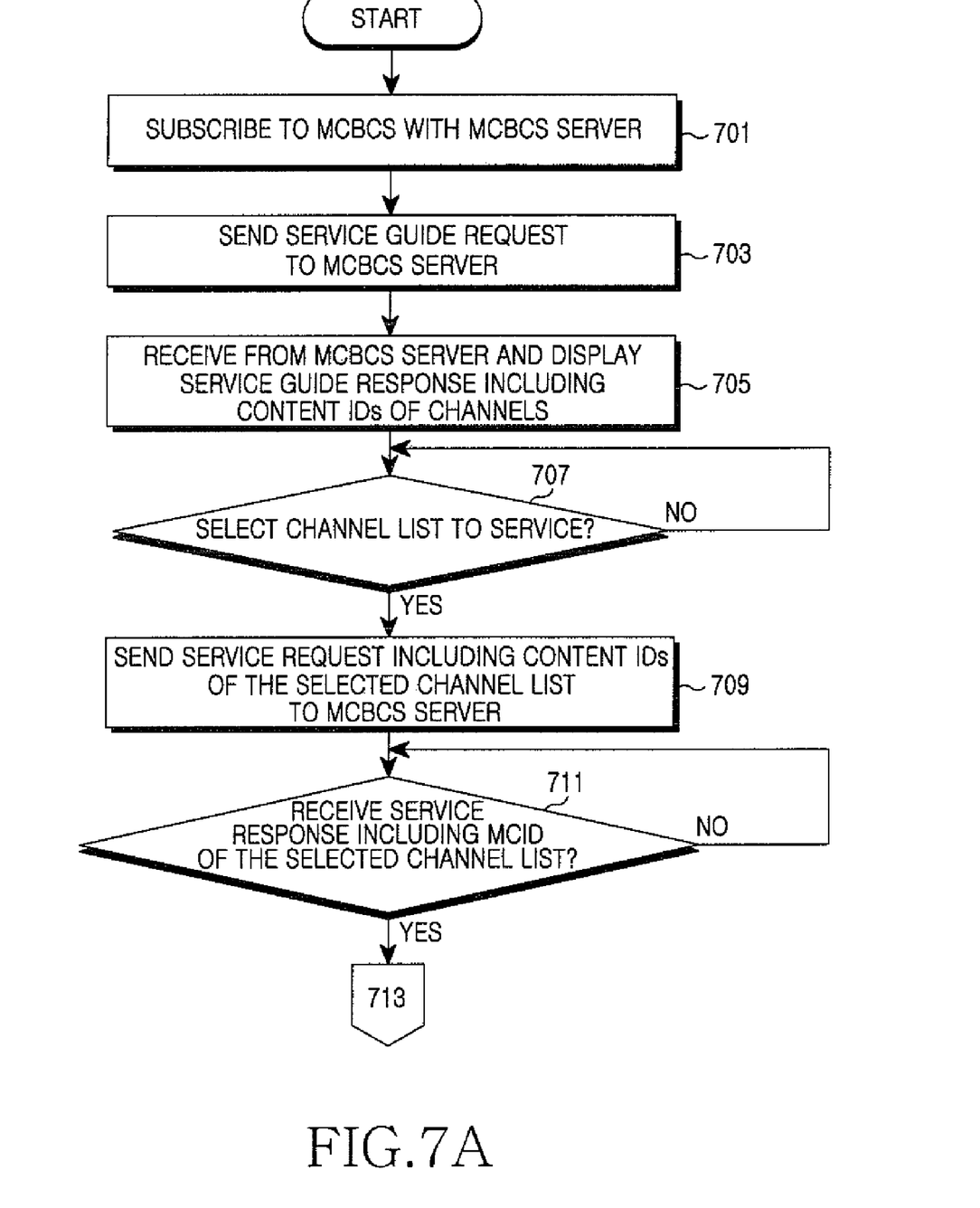
FIGS. 7A and 7B illustrate a method of an application layer processor of an MS for receiving MCBCS information in a BWA system according to an exemplary embodiment of the present invention.
Figure 7B:
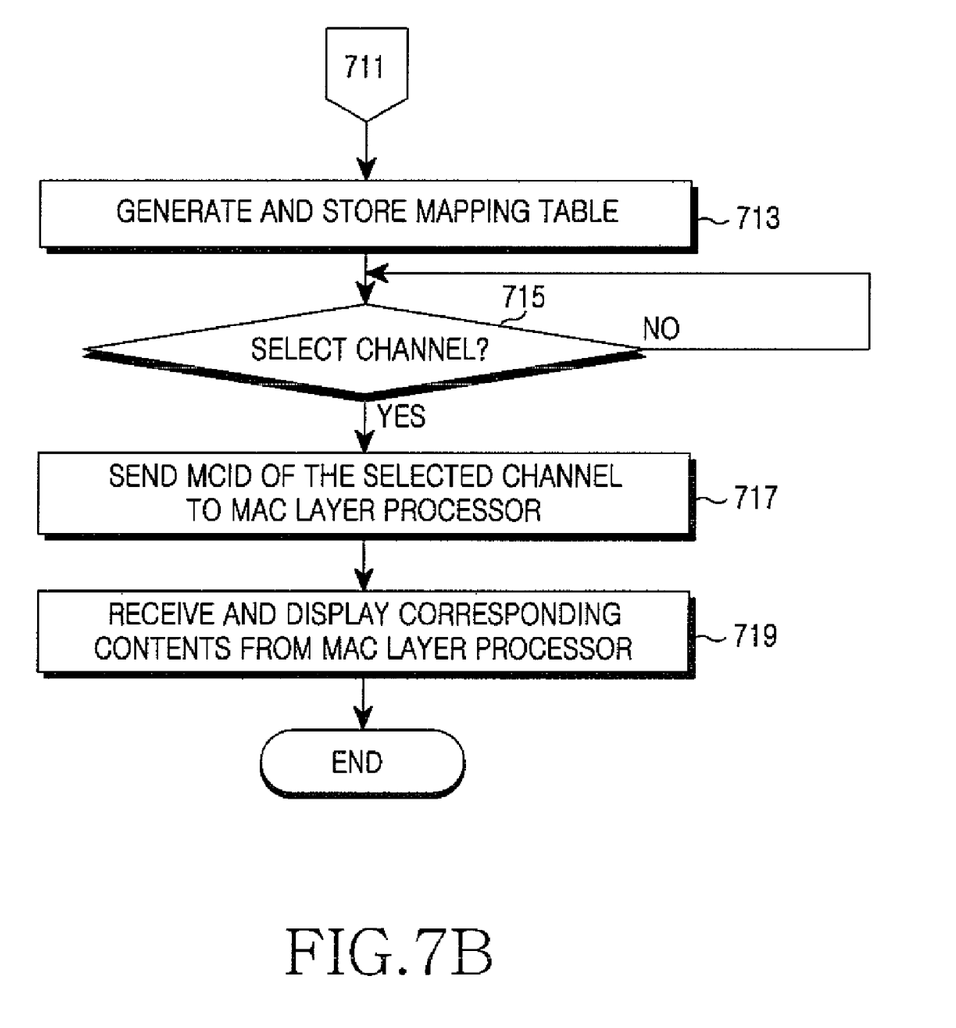

FIGS. 7A and 7B illustrate a method of an application layer processor of an MS for receiving MCBCS information in a BWA system according to an exemplary embodiment of the present invention.

In step 701, the application layer processor of the MS performs the MCBCS subscription with the MCBCS server which provides the MCBCS, to receive the MCBCS according to the user's request. Through the subscription, the application layer processor obtains a user ID.

The application layer processor sends a service guide request message to the MCBCS server to acquire MCBCS information in step 703, and receives a service guide response message including the service guide from the MCBCS server in step 705. Herein, the service guide request message includes the user ID obtained in the subscription, and the service guide response message includes content IDs of the entire channel and the broadcasting schedule. Receiving the service guide response message, the application layer processor displays the service guide in the display. The user, confirming the service guide, can select an intended channel list (or content list) for service.

In step 707, the application layer processor determines whether a channel list to service is selected by the user, for example by a key manipulation. When the channel list is selected, the application layer processor sends a service request message to the MCBCS server to request the service of the selected channel list in step 709. Herein, the service request message includes the content IDs of the selected channel list and the user ID.

In step 711, the application layer processor determines whether a service response message for the selected list is received or not. Herein, the service response message may include the user ID, MBS zone ID, MCIDs of channels of the channel list of which the service initialization is requested, a content decryption key and the like. When receiving the service response message, the application layer processor generates and stores a mapping table of the content IDs and the MCIDs for the channel list in step 713.

In step 715, the application layer processor determines whether the user selects one of the requested channels, for example by a key manipulation. When one channel is selected, the application layer processor provides an MCID of the selected channel to the MAC layer processor in step 717. In step 719, the application layer processor receives contents of the corresponding channel from the MAC layer processor and displays the received contents in the display.

Next, the application layer processor finishes this process.

Figure 8:
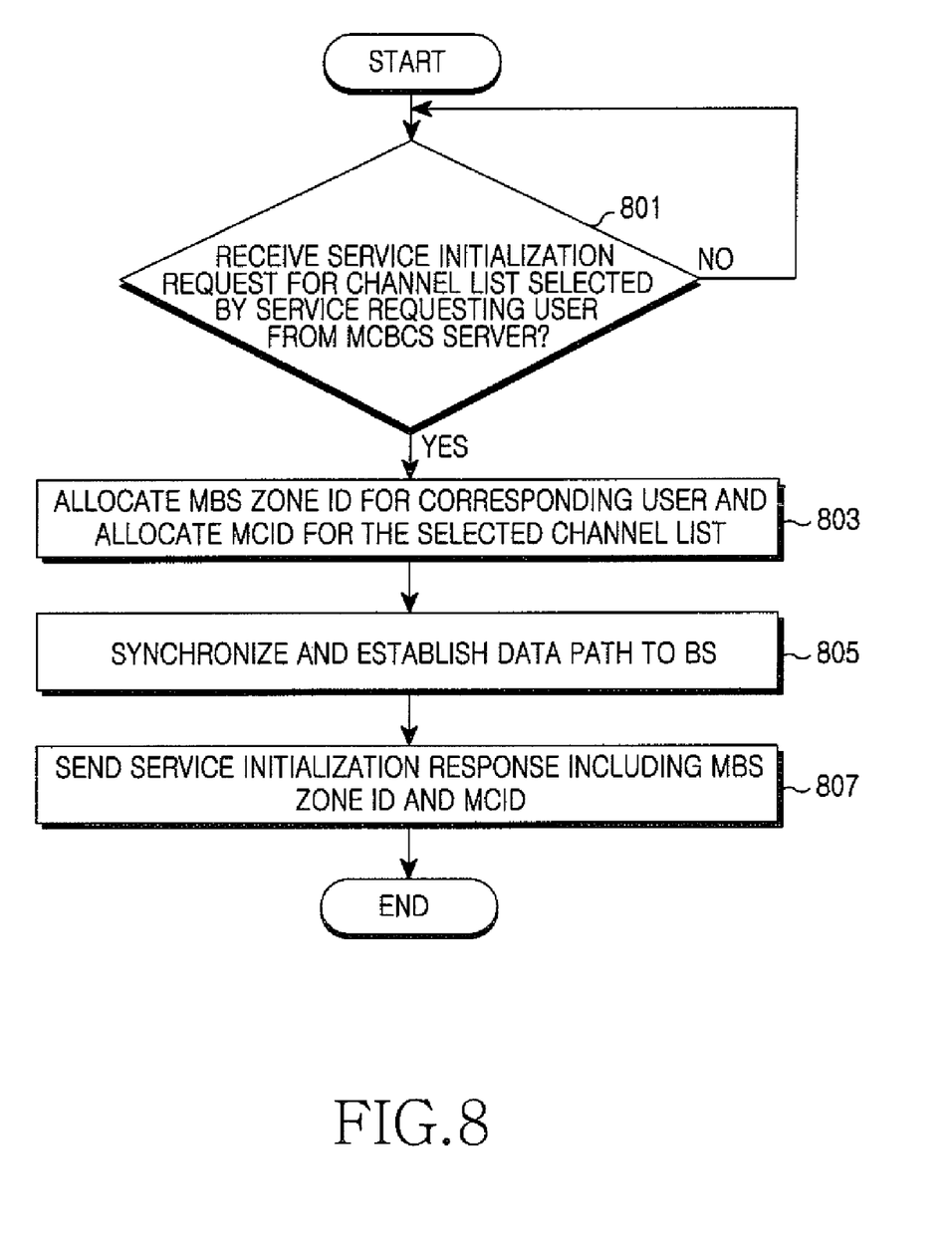
FIG. 8 illustrates a method of an MCBCS controller for unicasting MCBCS information in a BWA system according to an exemplary embodiment of the present invention.

FIG. 8 illustrates a method of an MCBCS controller for unicasting MCBCS information in a BWA system according to an exemplary embodiment of the present invention.

In step 801, the MCBCS controller determines whether a service initialization request message is received for the channel list selected by the service requesting user. Herein, the service initialization request message may include content IDs of the selected channel list, and is delivered together with content information such as broadcasting schedule, packet size, data rate of the selected channel (or content) list and the like.

When receiving the service initialization request message, the MCBCS controller allocates MCIDs for the channels of the channel list of the requested service initialization using the content information, and also allocates an MBS zone ID to the corresponding user when it is needed to allocate a new MBS zone ID to a region of the corresponding user in step 803.

In step 805, the MCBCS controller generates BS resource allocation and packetization information for the synchronization based on the content information received from the MCBCS server, and establishes data paths to send contents to BSs in the corresponding MBS zone. In step 807, the MCBCS controller sends a service initialization response message to the MCBCS server. Herein, the service initialization response message may include MBS zone IDs and MCIDs per channel (or per content).

Next, the MCBCS controller finishes this processor.

Figure 9A:
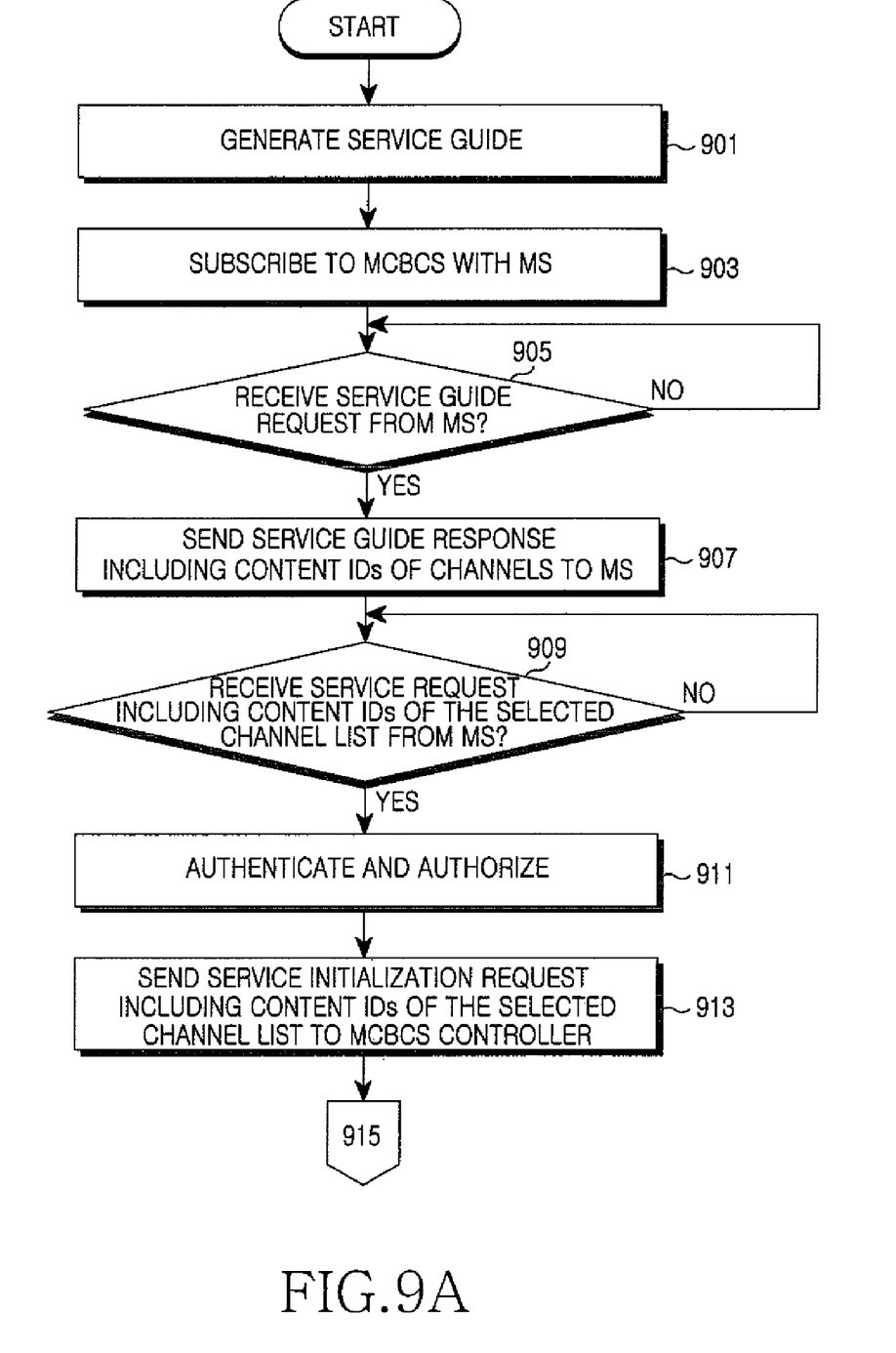
FIGS. 9A and 9B illustrate a method of an MCBCS server for unicasting MCBCS information in a BWA system according to an exemplary embodiment of the present invention.
Figure 9B:
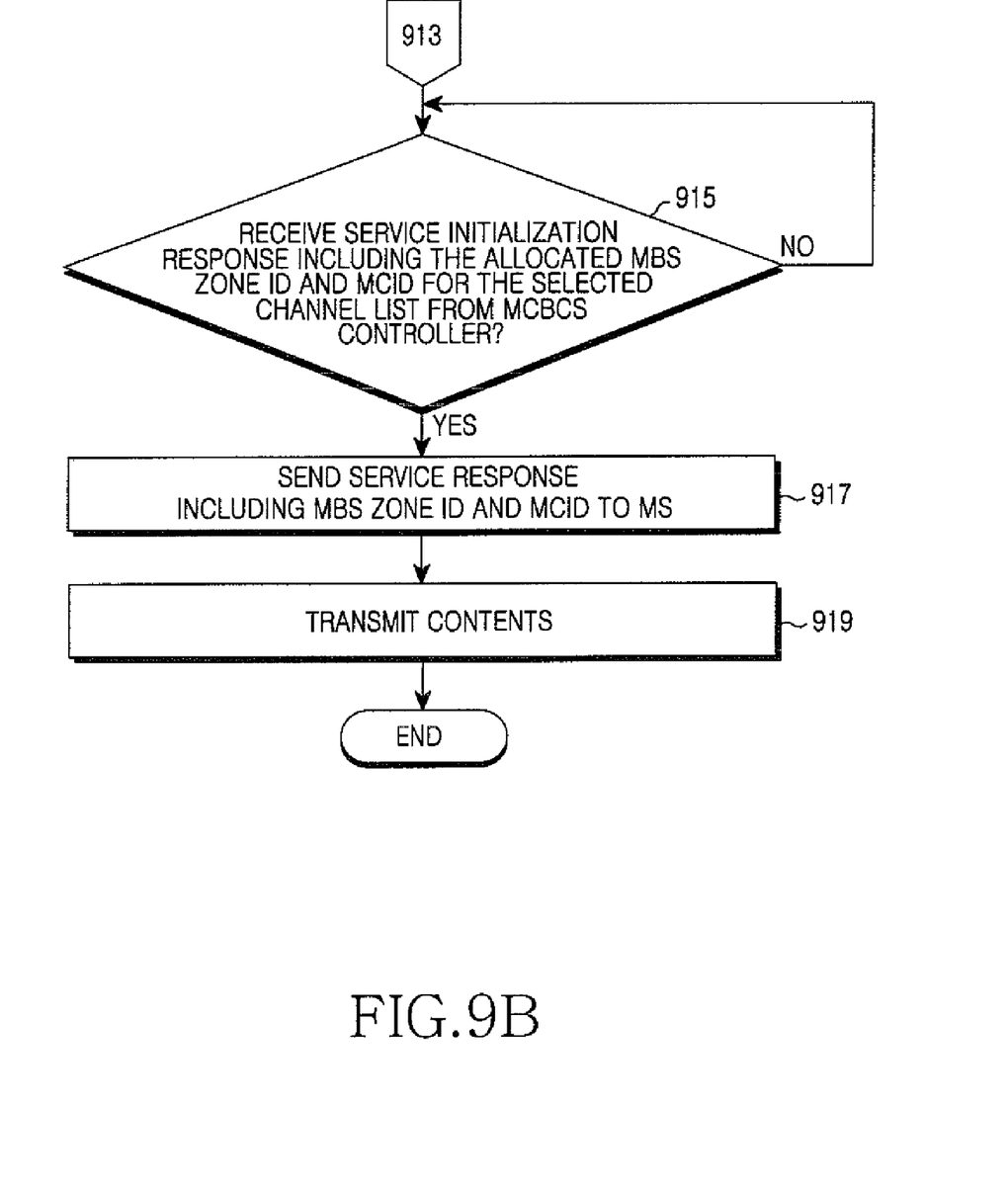

FIGS. 9A and 9B illustrate a method of an MCBCS server for unicasting MCBCS information in a BWA system according to an exemplary embodiment of the present invention.

The MCBCS server generates a service guide which describes information of its serviceable contents in step 901, and performs the MCBCS subscription with an MS which is to receive the MCBCS in step 903. The service guide includes information (i.e., content IDs) of contents readable by the user, and the broadcasting schedule.

In step 905, the MCBCS server determines whether a service guide request message is received from the MS. Herein, the service guide request message includes the user ID acquired by the MS in the subscription. When receiving the service guide request message, the MCBCS server determines whether the corresponding user has subscribed to the MCBCS using the user ID, and sends a service guide response message including the generated service guide to the MS in step 907. The service guide response message includes content IDs of the entire channel and the broadcasting schedule. The user, confirming the service guide, can select a desired channel list (or content list) for service.

In step 909, the MCBCS server determines whether a service request message is received from the MS for the channel list selected by the user, for example by a key manipulation. Herein, the service request message includes the content IDs of the selected channel list and the user ID. Upon receiving the service request message, the MCBCS server authenticates and authorizes the corresponding user using the user ID in step 911, and sends a service initialization request message of the selected channel list to the MCBCS controller in step 913. The service initialization request message includes the content IDs of the selected channel list. Together with the service initialization request message, the content information such as broadcasting schedule, packet size, and data rate of the selected channel (or contents) are transmitted.

In step 915, the MCBCS server determines whether a service initialization response message is received from the MCBCS controller. The service initialization response message may include MBS zone IDs and MCIDs per channel (or per content) allocated by the MCBCS controller.

When receiving the service initialization response message, the MCBCS server sends a service response message for the selected channel list to the MS in step 917, and transmits contents of the service requested channels to the MS in step 919. The service response message includes the user ID, the MBS zone IDs and the MCIDs per channel (or per content) and the content decryption key, so that the user terminal can decode the broadcast contents.

Next, the MCBCS server finishes this process.

As set forth above, exemplary embodiments of the present invention suggest a wireless network structure for efficiently providing the MCBCS, the roles of the provider entities to support various business models in the wireless network, the functions necessary for the MCBCS, and the methods for most efficiently matching the functions with the entities of the wireless network. To illustrate the operations of the wireless network, exemplary embodiments of the present invention describe the methods and the procedures for transferring the information of various MCBCSs to the user in the WiMAX network. Since the MCBCS information is broadcast to every MS in the service reception area, each MS does not need to know the information of the service provider. In addition, since it is not necessary to request and receive the MCBCS information individually, the system overhead for processing the request and the reception can be reduced and the air resource can be saved. Even when the MCBCS information is newly added, changed, or deleted, the MCBCS information can be updated on a periodic basis without the user's request. Therefore, the intervention of the user can be minimized and the user can gain the easier access and use of the various services. The decrease of the channel change delay time allows the user to receive the high-quality service and the system to lower the consumption of the radio resources when providing the MCBCS.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of a Mobile Station (MS) for receiving a service guide in a Broadband Wireless Access (BWA) system, the method comprising:

receiving a Downlink Channel Descriptor (DCD) message, comprising information relating to a broadcast channel which carries a service guide, from a Base Station (BS);

receiving service guides relating to one or more service providers over the broadcast channel using the information;

when the received service guides are fragmented service guides having a certain size, generating a unified service guide by reassembling the fragmented service guides; and when one service provider is selected, filtering only a service guide of the selected service provider in the unified service guide and displaying the filtered service guide in a display.

2. The method of claim 1, wherein the information relating to the broadcast channel comprises a Multicast Connection IDentifier (MCID).

3. The method of claim 1, wherein the receiving of the service guides comprises receiving a broadcast through an application layer.

4. An apparatus for providing a service guide in a Broadcast Wireless Access (BWA) system, the apparatus comprising:

a Base Station (BS) for transmitting a Downlink Channel Descriptor (DCD) message comprising information relating to a broadcast channel which carries the service guide and for broadcasting service guides of one or more service providers over the broadcast channel; and a Mobile Station (MS) for receiving the DCD message, for receiving the service guides using the information relating to the broadcast channel of the message, for generating a unified service guide by reassembling fragmented service guides when the received service guides are fragmented service guides in a certain size, for filtering only a service guide of a selected service provider in the unified service guide and for displaying the filtered service guide in a display when one service provider is selected.

5. The apparatus of claim 4, wherein the information relating to the broadcast channel comprises a Multicast Connection IDentifier (MCID).

6. The apparatus of claim 4, wherein the service guide is broadcast from the BS to the MS through an application layer.

7. The apparatus of claim 4, further comprising:
- a service provider for generating and transmitting a service guide;
- a MultiCast and BroadCast Service (MCBCS) network layer server for receiving service guides from one or more service providers, for aggregating the received service guides based on an MCBCS transmission zone in each service area, for fragmenting the service guides in a certain size if necessary and for transmitting the service guides to an MCBCS controller of a corresponding service area; and
- the MCBCS controller for receiving the service guides per MCBCS transmission zone of the corresponding service area and for transmitting the same service guide to BSs in the same MCBCS transmission zone.

8. The apparatus of claim 7, wherein the service area comprises a region in which the service provider provides a service and the MCBCS transmission zone comprises a region in which the same contents are broadcast in a corresponding service area.

9. The apparatus of claim 7, wherein the service provider performs at least one of a service guide generating function, a subscription provisioning/managing function for MCBCS reception of a user, an MCBCS content transmission function, a user authentication, an authorization, a charging function for an access control of an unauthorized user, a content protection function, a terminal provisioning function of users, a necessary MCBCS information provisioning function and a user interaction function.

10. The apparatus of claim 7, wherein the MCBCS network layer server performs at least one of an MCBCS transmission zone management function, a service guide processing and distribution function, an MCBCS content transmission function, a terminal management function of users, and a reception report processing function, and
- the MCBCS controller performs at least one of a data/time synchronization function to provide a macro diversity gain, an MBS zone management function, and a group paging information transmission function for notification.

* * * * *